United States Patent [19]

Loyd et al.

[11] 4,348,247
[45] Sep. 7, 1982

[54] METHOD OF FABRICATING A REINFORCED TUBULAR STRUCTURE

[75] Inventors: Morris S. Loyd, Northridge; Timothy W. McGann, Anaheim, both of Calif.

[73] Assignee: Rockwell International Corporation, El Segundo, Calif.

[21] Appl. No.: 238,733

[22] Filed: Feb. 27, 1981

Related U.S. Application Data

[62] Division of Ser. No. 16,454, Feb. 26, 1979, Pat. No. 4,272,971.

[51] Int. Cl.³ .................................................. B29C 27/16
[52] U.S. Cl. .................................. 156/156; 156/187; 156/294; 264/269
[58] Field of Search .............. 156/294, 293, 156, 187, 156/287, 194, 165, 190, 69, 192; 264/269, 267, 263; 64/1 S, 1 V, 1 R, 2 R; 138/153, 141, 143, 172, 174; 74/579 R, 581; 273/80 R; 428/398, 36, 35

[56] References Cited

U.S. PATENT DOCUMENTS

| | | | |
|---|---|---|---|
| 1,490,219 | 4/1924 | Labberton | 64/1 V |
| 1,958,982 | 5/1934 | Wintercorn | 64/1 V |
| 2,312,993 | 3/1943 | Stephens | 264/269 |
| 2,417,881 | 3/1947 | Munsen | 156/294 |
| 2,664,373 | 12/1953 | Reilly | 138/143 X |
| 3,071,162 | 1/1963 | Mick | 138/153 X |
| 3,152,458 | 10/1964 | Simonin | 64/1 R |
| 3,322,157 | 5/1967 | Mitchell | 138/172 |
| 3,447,572 | 6/1969 | Vanderbilt et al. | 138/153 |
| 3,542,079 | 1/1968 | Kelley, Jr. | 138/153 X |
| 3,579,400 | 5/1971 | Kanyok et al. | 156/294 |
| 3,718,573 | 2/1973 | Bidwell | 138/178 |
| 4,089,190 | 5/1978 | Worgan et al. | 64/1 S |
| 4,131,701 | 12/1978 | Van Auken | 64/1 S |
| 4,171,626 | 10/1979 | Yates et al. | 64/1 S |
| 4,173,670 | 11/1979 | Van Auken | 64/1 S |
| 4,185,472 | 1/1980 | Yates et al. | 64/1 S |
| 4,203,474 | 5/1980 | Lequeux et al. | 138/96 R |

FOREIGN PATENT DOCUMENTS

53-25565  1/1978  Japan ................................. 264/269

Primary Examiner—Michael W. Ball
Attorney, Agent, or Firm—Charles T. Silberberg

[57] ABSTRACT

A reinforced tubular structure comprising a metal tube and a cured composite tubular liner which increases the longitudinal stiffness of the tubular structure, the liner being adhesively bonded to the inner peripheral surface of the metal tube. The reinforced tubular structure is fabricated by forming a laminate of the composite material, wrapping it around a flexible mandrel, inserting the mandrel and wrapped laminate into the metal tube, and co-curing the laminate to the inner peripheral surface of the tube.

12 Claims, 10 Drawing Figures

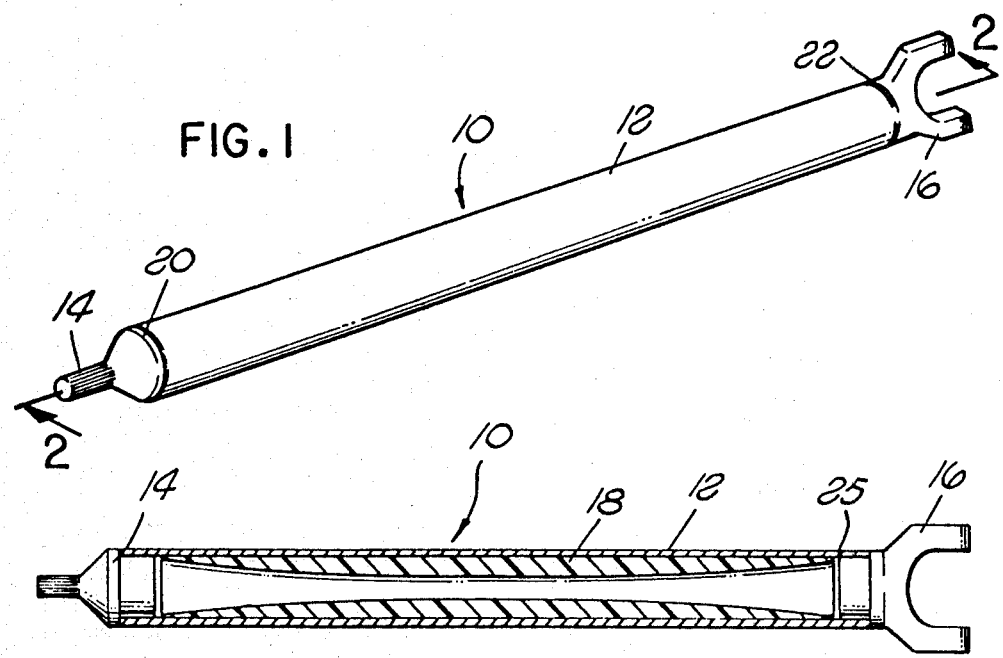
FIG. 1
FIG. 2
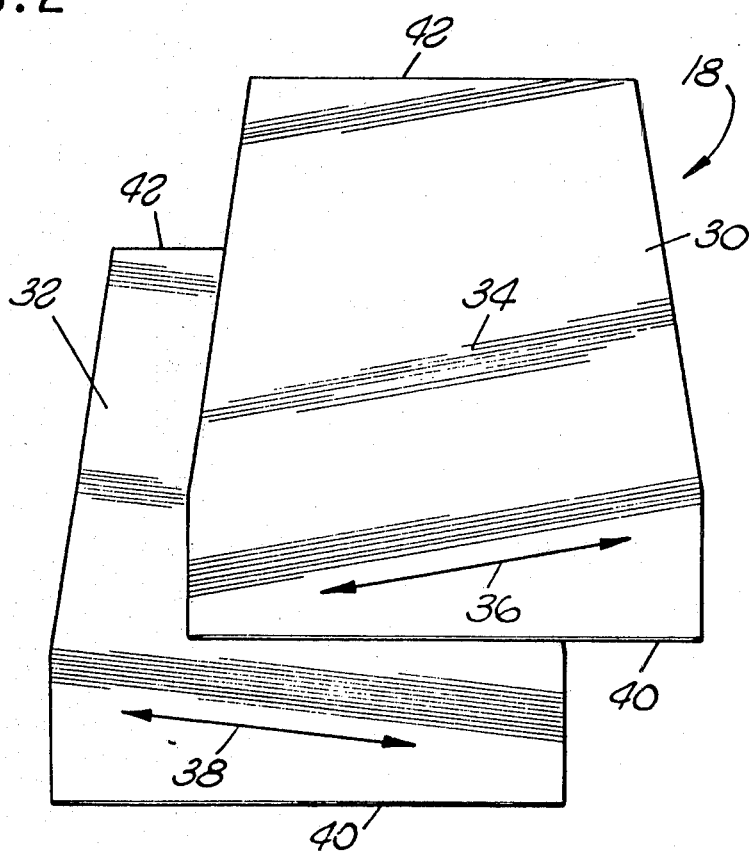
FIG. 3

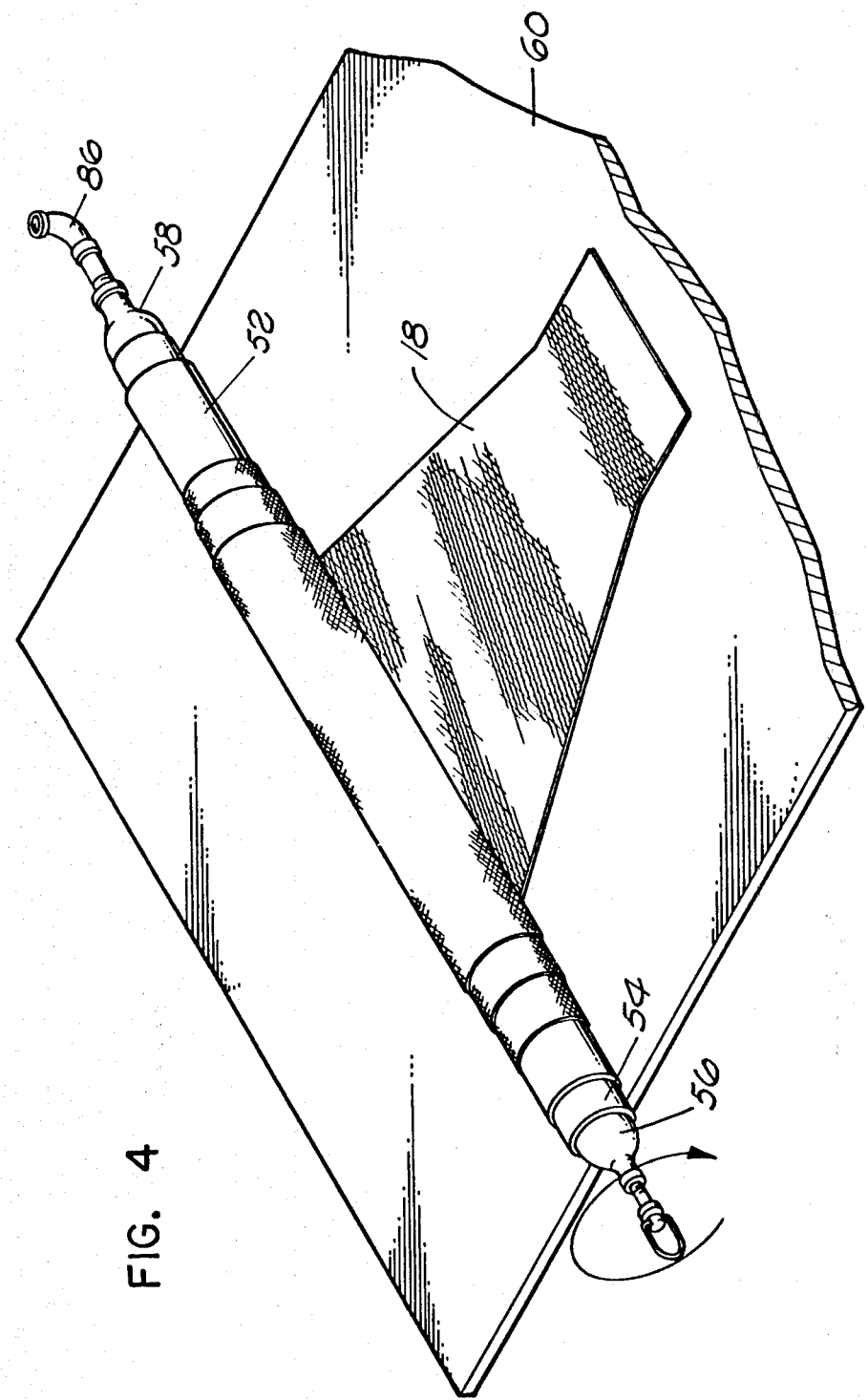

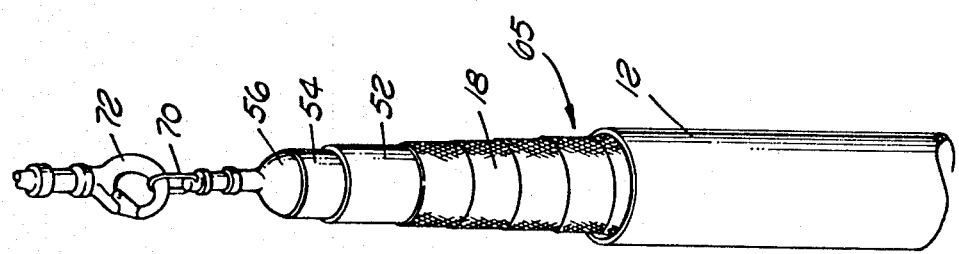
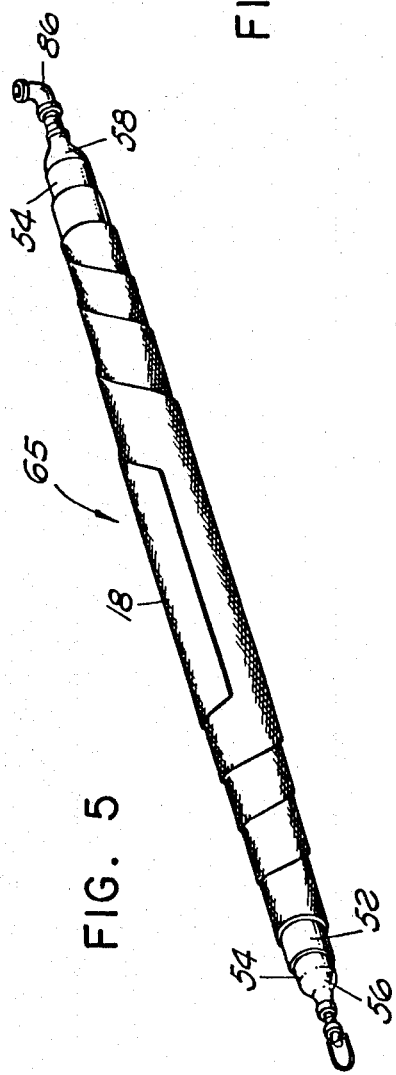
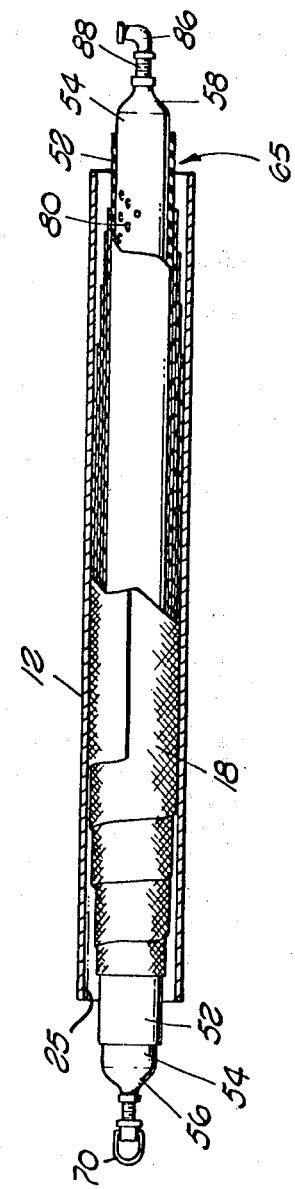

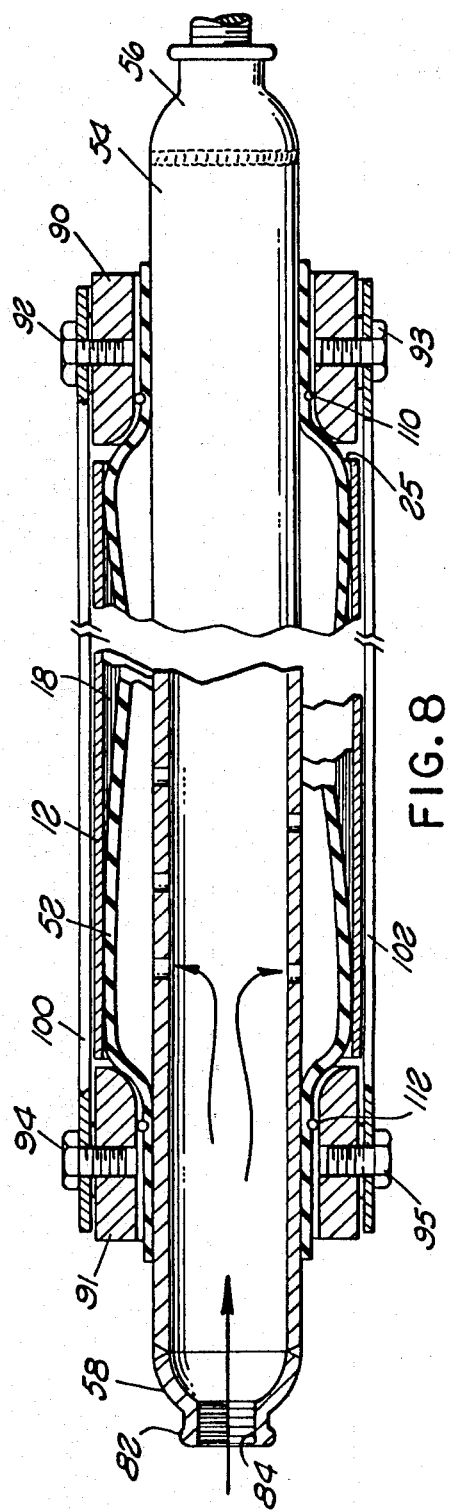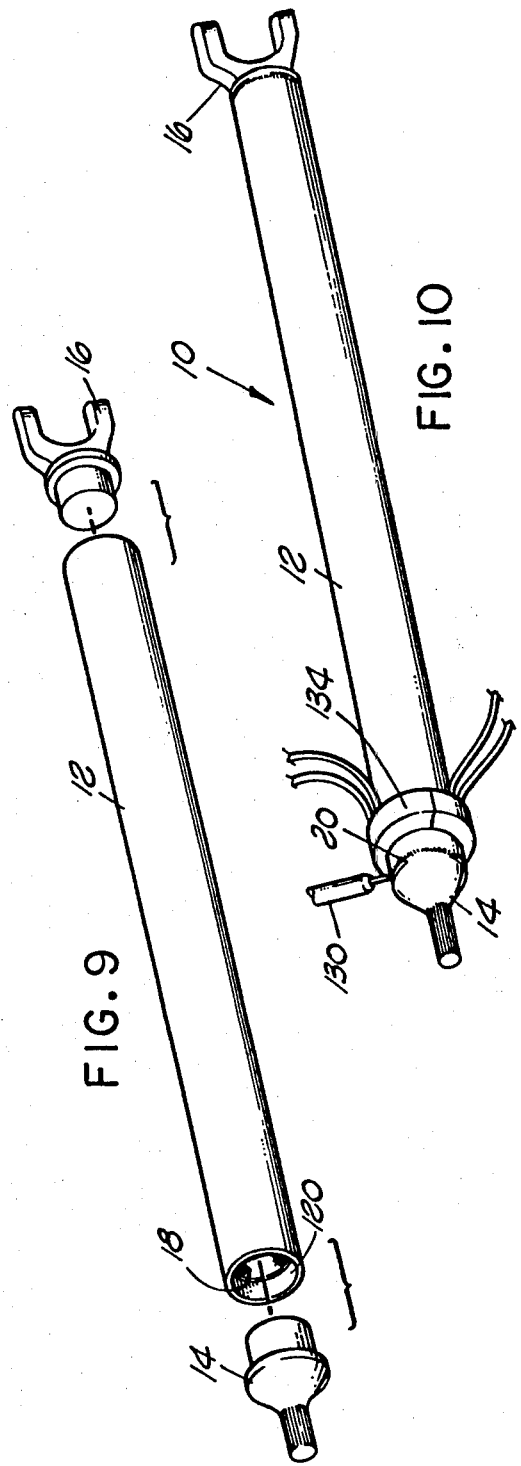

METHOD OF FABRICATING A REINFORCED TUBULAR STRUCTURE

This is a division of application Ser. No. 16,454, filed Feb. 26, 1979, now U.S. Pat. No. 4,272,971.

BACKGROUND OF THE INVENTION

(a) Field of the Invention

This invention generally relates to a reinforced tubular structure. More specifically, this invention relates to a lightweight reinforced tubular structure and method of fabrication thereof, such structure having an outer metal tube and an inner composite tubular liner bonded to the tube.

(b) Description of the Prior Art

Metal tubular components of various shapes, i.e. round, rectangular, etc., such as drive shafts, tie rods, dead axles, cross members, and steering mechanisms, are normally required to convey torque from a power source to a means for converting this energy into useful work. For example, in the case of conventional automobiles, and other vehicles, the drive shaft conveys torque from the transmission to the differential where it is converted into the drive force for the rear wheels of the vehicle.

Conventionally, such tubular structures such as automotive drive shafts, are constructed of steel, or similar dense material, and have a substantial diameter and thickness in order to provide sufficient stiffness to meet the required torque and torsion requirements. The excessive weight of such shafts significantly increases the cost of producing and running the vehicle by increasing fuel consumption of the vehicle, reducing shaft critical vibration speed, and increasing cost of the shaft itself. Decreasing the thickness of the shaft to reduce weight has not been a satisfactory solution, because while such a shaft could carry torsion loads, longitudinal stiffness would not be sufficient to meet the drive shaft torque carrying and critical speed requirements.

The above considerations are even more significant in longer drive shafts such as those for long-bed trucks. Because of the length requirement for the drive shafts, two or more drive shafts are used because the weight/stiffness ratio of a single metal drive shaft would result in too low a critical speed. The multiple drive shafts are connected by a support bearing and frame structure. Use of the support bearing and frame structure increases the weight and cost of the overall drive shaft due to the extra parts required and labor for installation thereof.

To obviate the aforementioned difficulties, tubular structures, such as drive shafts, have been fabricated using composite materials. Typically, these materials are formed of a resinous matrix reinforced with layers of filamentary material, such as Kevlar, boron, or carbon fibers. However, such composite tubular members have not been entirely satisfactory. While light in weight and being able to provide shaft stiffness, composite tubular members have not been satisfactory with regard to carrying of torsion loads. In addition, composite material is subject to foreign object damage and environmental effects. In this regard, chipping in the surface of the composite material caused by flying objects can cause delamination and effect an inbalance of the shaft. Environmental effects such as those resulting from moisture, chemical solvents, and heat can also result in delamination by breakdown of the adhesive bonding of the laminate. Connecting of composite tubular structures to metal end members, such as for drive shafts, has also presented a problem. In addition, while users of vehicles (particularly trucks) appreciate weight reduction of the vehicle, there is resistance to visible non-metal substitutes for steel drive shafts (because of concern with foreign object damage and environmental effects on the shaft).

PRIOR ART STATEMENT

U.S. Pat. No. 3,458,374 to Shobert discloses a method for making a braided tubular bearing having a polytetrafluoroethylene liner. The tubular structure formed by this invention is a plastic bearing which is formed around a lining of polytetrafluoroethylene.

U.S. Pat. No. 4,014,184 is directed to a propeller shaft liner wherein a paper tubular liner is inserted inside of the hollow cylindrical propeller shaft. The paper liner must be of a flexible material to provide resilient resistance to radial compression thereof. The liner is used to absorb and damp propeller shaft vibrations.

U.S. Pat. No. 4,089,190 to Worgan et al discloses an all composite drive shaft. U.S. Pat. No. 3,553,978 to Williams discloses a composite propeller shaft. This shaft is made of a polyurethane foam arbor which connects end members, and a composite tube formed on the exterior of the arbor which engages the end members.

U.S. Pat. No. 3,372,462 to Reed et al discloses a method for making plastic lined metal pipe. In this method, a plastic tube is heated to reduce its outside diameter, then inserted into a metal tube which has its diameter reduced to allow contact with the outside diameter of the plastic tube, and then thereafter the assembly is cooled such that the plastic tube expands into tight engagement with the metal tube. The plastic liner is disclosed to be used so that the pipe can be easily sterilized and so that other members can be attached to the pipe by being attached directly to the inner plastic tube rather than being affixed to the metal tube. It is not a purpose of this invention to use the plastic liner for increasing the longitudinal stiffness of the tubular structure. In this regard, plastic materials, such as polyvinyl chloride, which are capable of being reduced by heating, are used as opposed to a cured composite liner comprising a plurality of plies of fibrous material in a solid resin matrix.

SUMMARY OF THE INVENTION

It is, therefore, an object of the present invention to provide a reinforced tubular structure which is lightweight, yet economical, durable, and able to carry torsion overloads.

It is another object of the present invention to provide a reinforced tubular structure combining features of light weight and high critical speed.

It is another object of the present invention to provide a reinforced tubular structure which utilizes an inner composite reinforcing liner for an outer metal tube.

It is another object of the present invention to provide a reinforced tubular structure which utilizes a composite reinforcing liner which is not outwardly visible, and where protection for the liner from foreign object damage and environmental effects is provided.

It is another object of the present invention to provide a reinforced tubular structure which obviates the need in long-bed trucks for multiple drive shafts and associated connecting hardware.

It is still another object of the present invention to provide a method for fabricating such a reinforced tubular structure.

Briefly, in accordance with the invention, there is provided a reinforced tubular structure and a method for fabricating same. The structure comprises a metal tube having inner and outer peripheral surfaces and a cured composite tubular liner within said metal tube. The liner is adhesively bonded to the inner peripheral surface of the metal tube. The liner comprises a plurality of plies of fibrous material in a solid resin matrix. The liner increases the lonitudinal stiffness of the tubular structure. In the method of forming the structure, a laminate of a plurality of plies of fibrous material in an uncured resin matrix is formed. The laminate is wrapped around a flexible mandrel. The mandrel with the wrapped laminate is inserted into a metal tube having inner and outer peripheral surfaces. The laminate is then co-cured to the inner peripheral surface of the tube. Alternately, the laminate could be cured prior to insertion into the tube and bonded, rather than co-cured, to the inner peripheral surface of the tube.

Other objects and advantages of the invention will become apparent upon reading the following detailed description and upon reference to the drawings.

BRIEF DESCRIPTION OF THE DRAWINGS

FIG. 1 is a perspective view of a reinforced tubular structure in accordance with the present invention is the form of a drive shaft;

FIG. 2 is a sectional view taken in the direction of arrows 2—2 of FIG. 1;

FIG. 3 is an exploded perspective view of the laminate which forms the liner of the present invention with the plies thereof shown separated such that the direction of the fibers of said plies are illustrated;

FIG. 4 is a perspective view illustrating the step in the fabrication of the drive shaft of FIG. 1 of wrapping the laminate around a flexible mandrel;

FIG. 5 is a perspective view of the laminate fully wrapped around a flexible mandrel and back-up mandrel;

FIG. 6 is a fragmentary perspective view illustrating the step of inserting the assembly of the wrapped laminate and mandrels into the outer metal tube;

FIG. 7 is a longitudinal sectional view of the wrapped laminate and mandrels inserted inside the outer metal tube, prior to expansion of the flexible mandrel and laminate;

FIG. 8 is a longitudinal sectional view illustrating the co-curing step used in forming the reinforced tubular structure wherein the flexible mandrel is expanded such that the laminate is compressed between the flexible mandrel and inner surface of the metal tube;

FIG. 9 is an exploded perspective view of the reinforced tubular structure illustrating the end members which are attached to the metal tube; and FIG. 10 is a perspective view of the reinforced tubular structure illustrating the step of welding the end members to the metal tube.

While the invention will be described in connection with the preferred embodiment; it will be understood that it is not intended to limit the invention to that embodiment. On the contrary, it is intended to cover all alternatives, modifications, and equivalents that may be included within the spirit and scope of the invention as defined by the appended claims.

DETAILED DESCRIPTION OF THE DRAWINGS

Referring now to FIGS. 1 and 2 of the drawings, there is seen a reinforced tubular structure generally indicated at 10 according to the present invention. Tubular structure 10 is shown in the form of a drive shaft. Tubular structure 10 is comprised of a metal tube 12, end members 14 and 16, and a cured composite lining 18 adhesively bonded to the inner peripheral surface 25 of tube 12. Metal tube 12 is shown as cylindrical, but can have cross sections of various shapes, i.e. rectangular. The metal used for tube 12 is typically steel as this provides, if in sufficient thickness and tube diameter, sufficient stiffness in both torsion and bending, protection from foreign object damage, and protection from many environmental conditions (such as heat and moisture). While steel is a preferred material, other metals such as aluminum or titanium could be used. End member 14 and 16 are welded, as discussed in more detail hereinafter, to metal tube 12 along areas 20 and 22 respectively. Typically, end members 14 and 16 are adapted to be connectable to universal joints for the receiving and transmission of torque between members of the vehicle drive train.

The present invention obviates the aforementioned prior art problems by use of a composite liner which reinforces the metal outer tube. Because of the increased longitudinal stiffness provided by liner 18, the thickness of the metal tube 12 can be reduced (as necessary to carry torsion loads). As previously noted, torsion load requirements can be met with a reduced thickness for metal tube 12, the torsion loads being carried through the welded joints of end members 14 and 16 and the metal tube 12. By virtue of the reduced thickness of metal tube 12, and the use of the lightweight composite liner 18, overall weight of the drive shaft 10 is reduced. Thus, for a given length drive shaft, critical speed is increased. This allows with the present invention the use of a longer drive shaft while holding a given critical speed requirement, which can, depending on the overall length requirements, eliminate the need in trucks for multiple drive shafts with the central support bearing and frame structure.

Composite materials are normally strong, lightweight, tough, self-sustaining sheet material which are composed as a class, of a resinous matrix sheet reinforced with continuous, lineally aligned, parallel filaments. These sheets may be formed as a single layer sheet or as multi-layer laminates, and thereafter thermoset or cured to tough, hard, exceptionally strong panels.

As initially formed, these uncured sheet materials are flexible and deformable, providing panel-forming members which can be draped or otherwise conformed to various shapes and thereafter cured, by thermosetting, uopon the application of heat and pressure thereto, to tough, strong panels of permanent shape retention having exceptional tensile strength and stiffness imparted by the continuous filament reinforcing.

As shown in FIG. 3, liner 18 is formed of a laminate of a plurality of sheets or plies. In FIG. 3, the laminate is shown as two sheets 30 and 32. Sheets 30 and 32 are of uniform size and shape and are stacked to the desired length to form the laminate (the laminate 18 can be seen in assembled condition in FIG. 4). Sheets 30 and 32 are formed from a resin matrix reinforced with fibrous material in the form of continuous, lineally-aligned, parallel filaments 34. The sheets 30 and 32 are adhered together by the tackiness of the thermosetting resin matrix contained in the material itself when acquired in preimpregnated form (bonding of sheets 30 and 32 take place during the curing operation).

In keeping with the present invention, consideration must be given to the fiber orientation in stacking the layers of the laminate. Optimally, the fibers or filaments 34 of sheets 30 and 32 are aligned such that when the liner is positioned inside tube 12, the majority of fibers 34 will be substantially parallel to the longitudinal axis of the tube 12. This is because the maximum stiffness provided by fibers 34 is in the axial direction of the fibers. As such, maximum longitudinal stiffness will be provided to structure 10 by liner 18. In FIG. 3, the fibers are shown at an orientation indicated by arrows 36 and 38. Arrow 36 represents an orientation of +5° whereas arrow 38 represents orientation of −5°. Normally, this would be with respect to an axis which is parallel to the parallel ends 40 and 42 of sheets 30 and 32. The reason that fibers 34 of sheets 30 and 32 are not parallel to each other at an approximately 0° orientation, is that the cross-fiber orientation allows the fibers 34 of sheet 32 to support those of sheet 30 so that rollup of the laminate 18 is made easier and the fibers 34 are uniformly distributed throughout sheets 30 and 32. However, depending upon the method of formation of liner 18, fibers 34 of sheets 30 and 32 could have a 0° orientation. The important factor is that the majority (normally at least 80%) of fibers 34 have an orientation which is substantially parallel, i.e. within 10°, to the longitudinal axis of tube 12. It may be desirable to have a small portion of the fibers, i.e. 10%, at an approximately 90° orientation, i.e. positioned in a substantially circumferential orientation around the liner 18 after the liner 18 is joined to tube 12. This would make the composite liner 18 more compatible with regard to thermal expansion with metal tube 12. As such, a small sheet, or a plurality of small sheets, having 90° fibers, could be sandwiched between sheets 30 and 32.

As shown in FIG. 2, liner 8 has a variable thickness, being tapered from the middle to the ends thereof. This is basically due to the substantially trapezoidal shape (in plan view) of sheets 30 and 32 and the wrapping of the laminate 18 around a mandrel 52 as shown in FIGS. 4 and 5. This results in less and less of the length of laminate 18 being overlapped as it is rolled, i.e. there are more wrappings of the laminate 18 towards the center thereof. The purpose of this as best seen in FIGS. 5 and 7, is so that the outer periphery of liner 18 is adhesively bonded to the inner peripheral surface 25 of tube 12 across the windings of the laminate. This spreads the peel forces, which tend to separate the lining 18 from the metal tube surface 25, throughout the laminate 18, and substantially eliminates notch effects which also tend to separate lining 18 from surface 25.

To provide the longitudinal stiffness reinforcement to the reduced thickness metal tube 12, it is important to consider the type of composite material used for sheets 30 and 32, and specifically the fibers 34. The resin matrix can be of any suitable type and normally would be either a polyamide or epoxy. In selecting the composite material for liner 18, it should meet the following test:

$$\frac{E_L}{D_L} > \frac{E_T}{D_T}$$

where L and T are suscripts standing for liner and tube respectively, D equals density, and E equals longitudinal Young's Modulus. The important consideration here is that increased longitudinal stiffness is provided to the metal tube 12 with less weight or density added to the drive shaft 10 than by a corresponding increase in thickness in the metal tube 12. Thus, more stiffness is being added per unit weight with the composite liner than with the metal of the tube 12.

Optimally, the fibrous material will have a longitudinal Young's Modulus greater than for the metal of the metal tube. Under such circumstances, the Young's Modulus for the liner would normally approximate that for the metal tube. The advantage of course in using the high modulus fibers is that less plies would be needed for liner 18 to meet the needed longitudinal stiffness reinforcement requirement. As such, cost and weight of the liner would be reduced (further, too low a modulus for liner 18 could necessitate a liner thickness greater than the inside diameter of tube 12, or not leave sufficient clearance for insertion of the liner 18 into tube 12). Some suitable fibers 34, where metal tube 12 is steel, are listed below in Table I.

TABLE I

| FIBER | MANUFACTURER | YOUNG'S MODULUS (approximate) (Pounds per Square Inch) |
| --- | --- | --- |
| Pitch 50 | Union Carbide | $50 \times 10^6$ |
| Pitch 75 | Union Carbide | $75 \times 10^6$ |
| Pan 50 | Union Carbide | $50 \times 10^6$ |
| AS-1 | Hercules Corp. | $32-35 \times 10^6$ |

While only graphite fibers are listed above, other materials can be used, i.e. boron or KEVLAR. Steel has an approximate longitudinal Young's Modulus of $29 \times 10^6$ psi. In each of the above cases, the fibrous material has a longitudinal Young's Modulus greater than for the steel of the metal tube 12. However, when the fibers are incorporated into the resin matrix, the Young's Modulus for the liner 18 is reduced from the above figures. Table II sets forth the Young's Modulus for some of the above fibers in an epoxy laminate, and the density of the laminate:

TABLE II

| FIBER | LAMINATE YOUNG'S MODULUS (approximate) Pounds per Square Inch | LAMINATE DENSITY (approximate) Pounds per Cubic Inch |
| --- | --- | --- |
| Pitch 50 | $28 \times 10^6$ | .062 |
| Pitch 75 | $45-50 \times 10^6$ | .062 |
| AS-1 | $18-19 \times 10^6$ | .058 |

Steel has an approximate density of 0.283 pounds per cubic inch. As an example of the ratio test as described above, for the Pitch 50 fiber in an epoxy laminate, $E_L$ divided by $D_L$ equals $4.52 \times 10^8$. This is greater than the ratio of $E_T$ divided by $D_T$ for steel which equals $1.02 \times 10^8$. Normally, the liner ratio will be at least 400% greater than the metal ratio.

With further reference to FIG. 2, it can be seen that by welding the end members 14 and 16 to metal tube 12 with liner 18 provided inside of metal tube 12, the liner 18 is incased. The outer surface of drive shaft 10 is all metal. As such, composite liner 18 is not outwardly visible and is protected from foreign object damage, such as projectiles which may impact drive shaft 10, and from environmental effects such as water, and to a lesser degree heat, which can cause delamination of liner 18 and separation of the liner 18 at the bond joint.

It should also be noted that by using a non-metal material for liner 18, it has been found that the vibrations of the drive shaft are dampened.

The reinforced tubular structure 10 can optimally be formed as described hereinafter. Referring now to FIGS. 3, 4, and 5, the uncured sheets 30 and 32 are formed into a laminate 18. In the uncured state, composite sheets 30 and 32 are quite flexible and deformable. This allows the liner 18 to be rolled into a tubular configuration as shown in FIGS. 4 and 5. In FIG. 4, laminate 18 is shown being rolled or wrapped around a hollow cylindrical flexible mandrel 52 on a flat surface, such as a board 60. Mandrel 52 is preferably made of silicon rubber or other suitable flexible material. Laminate 18 is wrapped around mandrel 52 such that by virtue of the manner of wrapping and the substantially trapezoidal shape of laminate 18 (in plan view in unwrapped condition, or in other words, the shape of the principal surfaces of the laminate in unwrapped condition), a tubular structure with a variable thickness for laminate 18 results. In a typical wrapping of laminate 18, the outer ends were four plies in thickness while the center portion was twenty-eight plies thick. Normally prior to the wrapping step, flexible mandrel 52 is placed around a hollow cylindrical back-up mandrel 54 such that mandrel 54 fits snugly and coaxially within the bore of mandrel 52. Mandrel 54 is preferably made of metal for rigidity. Joined to the ends of mandrel 54 are end fittings 56 and 58. End fitting 56 seals off that end of mandrel 54 while end fitting 58 has a bore therein which allows connection to a line 86 for providing pressurized fluid, normally air, inside of mandrel 54. The fully wrapped laminate 18 is shown in FIG. 5.

Prior to insertion into tube 12 of the assembly generally indicated at 65 of the wrapped laminate 18, flexible mandrel 52, metal back-up mandrel 54, and end fittings 56 and 58, the outer surface of the tubular wrapped laminate 18 is covered with an adhesive film (not shown), normally of the same material as the resin matrix used in the laminate, i.e. epoxy. This is an optional, but desired, step because the resin matrix in the laminate itself would act as an adhesive during curing for joining of liner 18 to tube 12, but extra adhesive on the bond surface increases the strength of the bond. The film is then preferably treated with a substance which temporarily reduces the adhesiveness of the adhesive coating. An example of such a substance is powdered Cab-O-Sil. This substance is benignly absorbed into the adhesive coating during the curing process without affecting bond quality. Also prior to insertion of the assembly 65 into tube 12, the inner peripheral surface 25 of tube 12 is coated with a primer. Such a primer facilitates bonding of the composite liner 18 to the metal tube 12 and protects the metal from oxidation during the bonding step. An example of such a primer is one sold under designation 3M EC3917 by Minnesota Manufacturing and Mining Corporation. The primer can be applied by spraying surface 25, dipping tube 12 inside a bath, etc.

FIG. 6 illustrates the step of inserting the assembly 65 into metal tube 12. The diameters of mandrels 52 and 54 are such that the outer diameter of the wrapped laminate 18 at its largest point is slightly smaller than the inside diameter of metal tube 12. This assures that the whole assembly 65 can be inserted into tube 12 without jamming. Assembly 65 is preferably vertically inserted into metal tube 12 as this results in a minimum of contact pressure between the adhesive coating of the lining 18 and the primed surface 26 of tube 12. Typically, this would be accomplished by use of a vertical hoist (not shown) which is attached to loop 70 which normally forms part of end fitting 56 and a detachable hook 72. FIG. 7 illustrates assembly 65 as inserted inside of tube 12.

FIG. 8 illustrates the bonding or co-curing of the liner 18 to surface 25 of tube 12. Back-up mandrel 54, which is preferably metal, has a plurality of apertures 80 (see also FIG. 7) in the surface thereof. End fitting 58 has a cylindrical flange 82 at one end thereof. A threaded bore 84 is provided within flange 82. This allows the connection of line 86 (FIG. 7), which has a protruding end 88 which is threaded on the outside thereof for connection inside the threaded bore 84. Line 86 is connected to a suitable source of pressurized fluid (not shown). Close-out sleeves 90 and 91, which act to seal flexible mandrel 52 to back-up mandrel 54, are placed around the ends of flexible mandrel 52 which protrude from the ends of metal tube 12. Close-out sleeves 90 and 91 are positioned adjacent to the ends of tube 12 such that during expansion of flexible mandrel 52, there will not be a gap between the close-out sleeves and the tube ends. This would allow the rubber hose to expand out through such gap which would likely cause a rupture of mandrel 52. In order to assure that close-out sleeves 90 and 91 maintain their seal and are not pushed away from the tube ends 12, bolts 92 and 93 are provided in sleeve 90 and bolts 94 and 95 are provided in sleeve 91. Bolts 92 and 94 are connected to each other by a metal strap 100. Similarly, bolts 93 and 95 are connected to each other by a metal strap 102. Straps 100 and 102 act to restrain longitudinal movement of close-out sleeves 90 and 91 away from each other. Pinch wires or "O" rings 110 and 112 are also utilized to assure sealing of the flexible mandrel 52 to mandrel 54. "O" ring 110 fits between mandrel 52 and sleeve 90 while "O" ring 112 fits between mandrel 52 and sleeve 91. Sleeves 90 and 91 can be placed over "O" rings 110 and 112 respectively at room temperature because of an intentional loose fit. However, during curing and bonding, which takes place at elevated temperatures, the rubber of the "O" rings 110 and 112 becomes hot and expands. The expansion tightens the fit of "O" rings 110 and 112 between the close-out sleeves and flexible mandrel 52, thereby activating the seal. This type of seal allows the flexible mandrel 52 to expand in length without buckling the walls thereof internally.

Optimally, laminate 18 will be co-cured to the surface 25 of tube 12. By co-curing is meant that the laminate 18 is cured while at the same time being bonded to surface 25. An alternative approach would be to cure the laminate or liner 18, normally prior to insertion within tube 12, and then bond the same to surface 25 of tube 12. However, this is not preferred as an extra step is required and the fitting (and as such the bond) of the lining 18 to surface 25 would not be as good as with co-curing. During co-curing, the assembly (as shown in FIG. 8) is placed in a curing oven (not shown) where the temperature is raised to the curing temperature, i.e. normally within the range of 250° F. to 600° F. and typically 350° F. for a graphite epoxy laminate. Once the assembly is heated to the curing temperature, or simultaneously with the heating, pressurized fluid is introduced within mandrel 54. Such pressure would normally be in the range of 45-100 psi. Typically, however, compressed air at about 85 psi is used. The compressed air within mandrel 54 passes through apertures 80 and in combination with the elevated temperatures, expands flexible mandrel 52 outwardly toward surface 25 of metal tube 12. Expansion of flexible mandrel 52 accordingly expands liner 18 outwardly and against surface 25 of tube 12. This expansion compresses laminate 18 between mandrel 52 and surface 25 of tube 12. This condition is maintained for approximately one hour whereupon liner 18 is cured and bonded (co-cured) to surface 25 of tube 12. By virtue of the flexibility of the uncured laminate 18, the entire outer surface of the wrapped laminate 18 contacts surface 25 even though the liner 18 tapers in thickness from the middle to the ends thereof. As such, the ends of the tubular liner 18 are expanded further to contact surface 25 than the middle portion thereof. After curing, liner 18 still tapers in thickness from the middle to the ends. However, it is the inner surface of liner 18 which is tapered rather than the outer surface (see FIG. 2). If the liner 18 had already been cured prior to bonding to tube 12, this step would be the same except that all that would be accomplished is bonding of the liner 18 to surface 25, normally at the same temperature that would be used for co-curing, i.e. 350° F. for graphite epoxy, with flexible mandrel 52 providing the compressive pressure for bonding.

After the co-curing step, temperatures would be reduced to room temperature, pressure shut off, and the assembly as shown in FIG. 8 removed from the curing oven. The close-out sleeves 90 and 91 and the mandrels 52 and 54 could then be removed. As previously discussed, the fibers of liner 18 should be disposed substantially parallel to the longitudinal axis of metal tube 12. At this time tube 12 would appear as shown in FIG. 9.

FIG. 9 illustrates the connction of end members 14 and 16 to tube 12. As can be seen in FIG. 9, a portion 120 at both ends of surface 25 of tube 12 is not covered by lining 18. This allows for the end members 14 and 16 which fit within the ends of tube 12, to be welded to tube 12 with metal to metal contact. Thus, end members 14 and 16 would be welded to portions 120 of tube 12. This obviates the prior art problem of the weak metal end member to composite tube connection. FIG. 10 illustrates the welding of end member 14 to tube 12. As shown, a welding torch 130 produces a welded joint 20 that fastens end member 14 to tube 12. A water cooled split ring heatsink 134 is placed on the outer surface of metal tube 12 to isolate the welding heat from liner 18 (and the bond thereof to tube 12). After the end members are welded to tube 12, the liner 18 is incased, providing the aforementioned advantages.

Thus, it is apparent that there has been provided, in accordance with the invention, a reinforced tubular structure and method of fabrication thereof that fully satisfies the objectives, aims, and advantages set forth above. While the invention has been described in conjunction with specific embodiments thereof, it is evident that many alternatives, modifications, and variations will be apparent to those skilled in the art in light of the aforegoing description. Accordingly, it is intended to embrace all such alternatives, modifications, and variations that fall within the spirit and scope of the appended claims.

What is claimed is:

1. A method of forming a reinforced tubular structure comprising:
    forming a laminate of a plurality of plies of fibrous material in an uncured resin matrix, the laminate having two opposed principal surfaces, the shape of the principal surfaces being substantially trapezoidal;
    wrapping the laminate around a flexible mandrel such that the laminate is formed into a variable thickness tube tapering from the middle to the ends thereof;
    inserting the flexible mandrel into a metal tube, the metal tube having inner and outer peripheral surfaces; and
    co-curing the laminate to the inner peripheral surface of the metal tube such that the laminate is bonded to the inner peripheral surface of the metal tube across a plurality of windings of the laminate, said flexible mandrel being expanded during said co-curing such that the laminate is compressed between the flexible mandrel and the inner peripheral surface of the metal tube.

2. The method of claim 1 wherein the ratio of longitudinal Young's Modulus to density for the laminate is greater than for the metal tube.

3. The method of claim 2 wherein the fibers of the fibrous material are disposed within the laminate such that the majority of fibers will be aligned substantially parallel to the longitudinal axis of the metal tube after co-curing.

4. The method of claim 3 also including the steps of applying a primer to the inner peripheral surface of the metal tube, and applying an adhesive coating to the outer surface of the wrapped laminate.

5. The method of claim 3 also including the step of connecting metal end members to respective ends of the metal tube such that the laminate is incased.

6. The method of claim 3 wherein the flexible mandrel is tubular and is expanded by application of pressurized fluid therein.

7. The method of claim 6 also including the step of placing the flexible mandrel around a hollow back-up mandrel, the back-up mandrel having a plurality of apertures therein, and wherein the pressurized fluid passes from within the back-up mandrel through the apertures to within the flexible mandrel.

8. The method of claim 7 also including the step of removing the back-up mandrel and flexible mandrel from within the metal tube.

9. The method of claim 8 also including the steps of applying a primer to the inner peripheral surface of the metal tube, and applying an adhesive coating to the outer surface of the wrapped laminate.

10. The method of claim 9 also including the step of applying to the adhesive coating a substance which temporarily reduces adhesiveness of the adhesive coating.

11. The method of claim 10 wherein the fibrous material is graphite, the resin matrix is an epoxy matrix, and the flexible mandrel is made of rubber.

12. The method of claim 10 also including the step of connecting metal end members to respective ends of the metal tube such that the laminate is incased.

* * * * *